US005311246A

United States Patent [19]

Warner et al.

[11] Patent Number: 5,311,246

[45] Date of Patent: May 10, 1994

[54] FREQUENCY MODULATED ACUTANCE GUIDE AND METHOD OF USE

[75] Inventors: Richard D. Warner, Clinton; Anthony P. Stanton, Glenshaw, both of Pa.

[73] Assignee: Graphic Arts Technical Foundation, Pittsburgh, Pa.

[21] Appl. No.: 935,869

[22] Filed: Aug. 26, 1992

[51] Int. Cl.[5] ............................................ G03B 27/52

[52] U.S. Cl. ........................................ 355/40; 355/77; 355/133

[58] Field of Search ........................... 355/40, 77, 133; 356/243

[56] References Cited

U.S. PATENT DOCUMENTS

| | | | |
|---|---|---|---|
| 3,393,618 | 7/1968 | Baker | 95/1 |
| 3,658,536 | 4/1972 | Wolf | 96/69 |
| 3,998,639 | 12/1976 | Feldman et al. | 96/36.2 |
| 4,003,311 | 1/1977 | Bardin | 101/426 |
| 4,004,923 | 1/1977 | Hensel | 96/27 |
| 4,142,898 | 3/1979 | Izu | 96/75 |
| 4,183,659 | 1/1980 | Brunner | 355/40 |
| 4,212,936 | 7/1980 | Giampieri | 430/503 |
| 4,278,467 | 7/1981 | Fadner | 106/2 |
| 4,286,385 | 9/1981 | Huck | 33/1 |
| 4,288,157 | 9/1981 | Brunner | 355/40 |
| 4,344,683 | 8/1982 | Stemme | 354/106 |
| 4,374,921 | 2/1983 | Frenchik | 430/338 |
| 4,419,426 | 12/1983 | Kehl | 430/30 |
| 4,469,025 | 9/1984 | Loffler et al. | 101/171 |
| 4,477,562 | 10/1984 | Zeller-Pendrey | 430/513 |
| 4,527,333 | 7/1985 | Warner | 33/1 |
| 4,551,413 | 11/1985 | Bell | 430/270 |
| 4,566,192 | 1/1986 | Hankins et al. | 33/1 |
| 4,619,892 | 10/1986 | Simpson et al. | 430/505 |
| 4,784,939 | 11/1988 | Van Pham | 430/607 |
| 4,855,220 | 8/1989 | Szajewski | 430/505 |
| 4,881,181 | 11/1989 | Jeschke et al. | 364/519 |
| 4,903,141 | 2/1990 | Morton et al. | 358/448 |
| 4,947,746 | 8/1990 | Jeschke et al. | 101/211 |
| 4,965,679 | 10/1990 | Morton et al. | 358/462 |

OTHER PUBLICATIONS

"A Guide To Understanding Graphic Arts Densitometry", X-Rite, Grandville, Mich., Apr., 1992.

"Test Images for Printing, an International Reference", Pamela J. Goff and Frank V. Kanonik, Graphic Arts Technical Foundation, Pittsburgh, Pa., Third Edition, 1990.

*Primary Examiner*—Richard A. Wintercorn

*Attorney, Agent, or Firm*—Stanley J. Price, Jr.

[57] ABSTRACT

A control area is imaged on photo-sensitive graphic arts material to be evaluated for the sharpness of images printed on the material through the various stages of the reproduction process. The control area includes a light transmitting image divided into a plurality of segments where the image is a sharp-edged line element of a fixed preselected width. The line element is repeated from segment to segment in a preselected pattern of line elements separated a preselected distance apart by a space. The first segment of a control area has a solid optical density. At the opposite end of the control area is positioned a second segment having a substrate optical density. An intermediate segment includes a plurality of sections in which the line elements in each section are spaced apart the same distance, and the spacing between line elements varies from one section to the next. Thus, a range of spatial frequencies of repeating line elements is provided in the control area. By using an integrating densitometer, the optical density at any section at a desired frequency below the solid optical density is measured. At the desired frequency, a theoretical optical density is calculated. The ratio of the theoretical integrated optical density to the measured integrated optical density provides an index of acutance which is 1.0 for a perfectly image line element. If the index is unacceptable, the width of the line element is altered by a calculated correction factor to achieve an acceptable index of acutance.

20 Claims, 3 Drawing Sheets

FREQUENCY MODULATED ACUTANCE GUIDE AND METHOD OF USE

BACKGROUND OF THE INVENTION

1. Field of the Invention

This invention relates to a device for quantitatively measuring the visual sensation of the sharpness of an image printed on a substrate and more particularly to a method and apparatus for determining an index of the acutance as a quantitative indication of the quality or sharpness of a image for graphic arts films, offpress proofs, press proofs, printing plates, printed press sheets and the like.

2. Description of the Prior Art

In the photographic industry the term "sharpness" has been used to describe the subjective impression produced by the edge of a image in the brain of an observer and the optical density distribution as measured by some objective criterion. However, because sharpness is a psychometric evaluation based on a number of factors an objective measurement of image sharpness has not heretofore been obtainable. The various factors that enter into a determination of sharpness include image register, subject matter, edge enhancement, density range, and resolution.

More recently, the term "acutance" has been used in the photographic industry to distinguish between the subjective impression of sharpness and the objective measurement of the optical density gradient made by a microdensitometric trace across the edge of an image. It has been generally recognized that image sharpness is a subjective concept that can not be objectively measured. Nevertheless, those skilled in the art have felt that a correlation might be formed between the subjective evaluation of image sharpness and acutance measurements made with a microdensitometer.

One known approach is to utilize a series of photographic prints of the same subject but differing degrees of sharpness. The sharpness is manipulated by using different negative materials. Observers then rank the photographic prints according to their sharpness. General agreement is found between the rankings, and the data is manipulated to provide numerical values for the subjectively determined sharpness. However, these efforts overall indicate that there is no satisfactory correlation between image sharpness (acutance) and resolution where resolution is defined as an ovserver's ability to distinguish closely spaced line pairs under adequate magnification. The efforts to find a correlation between the psychometric evaluation of sharpness and an index of acutance calculated from edge density tracings have led to the conclusion that set by the eye for a given viewing condition. However, this approach has indicated that resolving power is not found to furnish consistent information about the perceived sharpness of prints.

Efforts have also been made to examine the effect of sharpness and resolving power on image definition which is regarded in the art as the quality aspect of the photo that is associated with the clarity of detail. Sharpness then by some authorities has been recognized as the impression made on the mind of an observer when examining the boundaries of well resolved elements of detail. In application of these theories, experiments have been conducted utilizing a series of photographic prints on which the graininess and tonal characteristics were held constant by using the same materials in processing for all prints. Sharpness and resolution were varied by changing the distance from the lens to the film. A three-part test subject consisted of a photographic image to be judged for definition, a graduated set of lines for determining resolving power, and a sharp-edge element for measuring acutance. These experiments led to the conclusion that when graininess and tone reproduction are constant and resolving power is adequate to reproduce all the detail that can be observed under the conditions of viewing, acutance correlates well with definition. However, resolution becomes an important component of definition if it drops below the value required to render all the detail that can be observed.

Additional experiments have been attempted in the past to develop means of evaluating and quantifying print quality attributes that ca be distinguished as independent of the subject matter of the image. One approach has been to utilize a star target formed of a circular series of pie-shaped wedges. Star targets are well known for use in measuring the resolution of camera lenses and have proved adequate for measuring the resolution of lithographic printing.

Based on the premise that the observer's impression of sharpness can be predicted from microdensitometric traces across sharp edges in the image, it has been proposed by some authorities that a more complete description of an image could be to determine the ratio of the reflectance changes across various size detail or lines in the original image to their corresponding reflectance change in the lithographic print. With this approach, a scanning microdensitometer is used to determine an edge gradient profile from which a spread function is calculated. Fourier transforms of the spread function are used. The presence of slur, image spread, and doubling had the effect of adding higher harmonics into the sine wave analysis.

The acutance of typed images has also been measured using video camera input. With this approach, acutance is defined as the summation of density differences of pixels in the type in relation to the upper and lower thresholds for density. Edge smoothness is calculated in terms of the standard deviation of pixels from the regression line representing a theoretical sharp edge. Several reproduction systems are compared with respect to their acutance and edge smoothness.

In lithography, various aspects of image structure are related to print quality, where the overall image definition is influenced primarily by resolution and sharpness. Three distinct components of image sharpness have been recognized as including the minor contrast of the printed image, the register accuracy in process color work, and the edge enhancement performed on the image during the color separation process. It is generally recognized that substrates with high brightness and low internal light scatter have greater sharpness. Furthermore, images with higher density range have higher sharpness. Also, it has been found that by increasing ink film thickness, the density range is increased but resolution is lowered.

The register latitude for a given picture varies with the amount of detail and color contrast in the image and with the screen ruling selected for the job. Edge enhancement is a variable and depends on the preferences of the customer, the sharpness of the photographic original and the requirements of the printing system. Optimization conditions are not clear in the case of sharpness. In practice, compromises are necessary between optimum sharpness and the needs for tone and color reproduction.

It is also known to use electronic scanners for making color separations to provide the means for reproducing a considerable range and magnitude of electronic edge enhancement effects through unsharp masking. Three functions are accomplished by unsharp masking. It must correct for the modulation transfer function limitations in originals due to the materials and imaging equipment. It must allow for limitations of the reproduction process. It must also provide a means for editorial change to alter the visual impact of the image. The performance of unsharp masking in electronic scanners is constrained by considerations of resolution, screen, intensity, fringing, and enlargement. Sharpness appearance is influenced by tonal reproduction and frequency response. One approach has been directed to the need for the inclusion of edge effects in the brightness model.

In an effort to measure and evaluate image sharpness, the printing industry has found for some imaging systems that the calculation of acutance from microdensitometric traces has a correlation with perceived sharpness. However, this technique is not available to the printer since it involves specialized equipment. Accordingly, as an alternate means for calculating acutance, the printing industry has developed targets or guides that include line elements which vary in size and frequency. However, the known targets and guides are used solely for the measurement of resolution and not for a quantitative determination of image sharpness.

U.S. Pat. No. 3,393,618 discloses a guide or a control strip for use in the preparation of printing plates in order to determine if the printing operation is running properly. In this context, it is important to determine whether the plate is under developed or over developed, under exposed or over exposed. Then it must be determined once the plate is on the press whether or not the print quality is proper. In an effort to obviate these problems, a control strip in the form of a stencil is placed on a plate by a photographic process, either positive or negative. The control strip is an image bearing item, normally a negative, and is handled by the plate maker so that the image therefrom is located on the plate in a manner designed to measure and inform the plate maker and the pressmen of proper conditions. Preferably, the control strip is located on the edges of the plate so that it can be removed from the resulting print without effecting the print. The control strip has a pattern which is used to determine the condition of the plate and will indicate a gain or loss in image and will indicate any over or under exposure. Reference patterns are located adjacent to each other and the patterns may consist of any geometric design, such as round dots or parallel lines. If the image on the plate is proper then the different reference areas will appear to have equal visual tone. If any over or under exposure or development has taken place in preparing the plate, then the small signal design area of the control strip will change in visual tone proportionately more than the large reference area. This produces a recognizable pattern which informs the plate maker that his plate is improper.

U.S. Pat. No. 3,998,639 discloses a test pattern for determining deviations in the formation of masks used for printing electronic circuit patterns on a photoresist film on a wafer surface. The test pattern includes a grid of lines spaced a preselected distance apart so as to appear as a gray area. The shade of the gray area changes significantly as the width of the lines is altered. To determine if the width of the lines of the test pattern has deviated from a preselected width, a plurality of reference patterns having a preselected deviation from the desired width of line are printed along with the test pattern on the reference plate. If the test pattern has a shade of gray that falls between the two reference patterns, then it is concluded that the test pattern is deemed to be satisfactory because the deviation in the shade of the gray pattern is readily observable.

U.S Pat. No. 4,004,923 discloses a test film target used as a control guide for monitoring developer activity in automatic plate processors to show dot size change in printing and dot size change in bi- and tri- metallic etching. The guide includes a film laid-down on a border or other non-printing area of the negative or positive film and exposed together with the original film to be reproduced on the photosensitized printing plate. Visual observation of the reproduced guide on the plate with the negative eye permits readout of developer solution activity and provide a means for determining when replenisher must be added to the developer solution or a diluent for the developer fluid must be added before any diminution or increase in the strength of the developer has any noticeable effect on the reproduction of the original film. The test film target includes a number of tint areas such as a ¼ inch circle of 200 line per inch tints. The tints are composed of crossed bands and the width of each band increases in a progressive manner. Since each of the fine tint circles has different band widths, one of the circles will match the background in integrated optical density or tonal effect and therefore, blend together with it. Accordingly, when exposure and development are optimum, the test film will usually blend at a prescribed tint circle. However, when the background does not blend at the prescribed tint circle, an adjustment must be made in the developing process such as adding replenisher to the developing film, if sufficient replenisher is added, the prescribed tint circle will once again blend into the background. With this arrangement, a visual indication of exposure conditions is obtained.

U.S. Pat. No. 4,183,659 is directed to the problem of controlling variations of the thickness of the lines forming the text appearing in a photographically produced brief. The control device in the form of a screen or raster area is printed by photographic means on the photographic print carrier. The screen area may include dots or lines having preselected widths and preselected distance or gaps therebetween. If during the exposure and development of the print carrier, an increase in the thickness of the lines occurs, the spaces or gaps will be filled out and the screen area will turn completely black. On the other hand, in the event a decrease of the thickness of lines occurs, the lines or screen dots in the screen or raster area decrease to an extent that they disappear. Therefore, undesirable broadening or narrowing of the lines in the screen area requires visual detection by the human eye or by means of a densitometer.

U.S. Pat. No. 4,288,157 is a further example of apparatus for controlling the quality of a picture, such as a screened print, processed in a reproduction process. The quality of the screen print is determined by such factors as resolution power, tone displacements, screen dot formation, color layer thickness, and grey balance. In order to evaluate the quality of the screened print based on the above factors, a control device consisting of a number of measurement symbols, such as screen dots, are printed in a preselected array on the picture carrier upon which the printing process is performed. Deformations in the measurement symbols are monitored as the carrier advances through the various stages of the reproduction process. When a deformation occurs in the shape or size of the measurement symbol, the deformation occurs uniformly in all directions during the production process. Therefore, the deformation will become visibly noticeable when a recess or space between the symbols disappears. Upon the disappearance of a recess with a known width, it is concluded that the measurement symbol has reached a certain dimension that has exceeded an acceptable degree of deformation. Then from the value of the known relationship between the original surface of the parts of a measurement symbol of the control device and the size of the recess at such measurement symbol, it is then possible to draw conclusions about the size of the enlargement of the screen dots of the reproduced picture.

U.S. Pat. No. 4,419,426 discloses method and apparatus for visually inspecting the reproduction quality of drawing elements exposed by means of a cathode ray tube on light-sensitive photo material. Visual inspection of print quality to determine whether or not the print is over or under exposed is accomplished by exposing a control field by a cathode ray tube on light-sensitive material. The field includes three different raster points which are combined into a control field. The control field is co-exposed at the beginning and at the end of a text column. If conditions arise during the exposure or development process which result in a change of density and stroke thickness, then an over exposed or under exposed condition can be perceived. If no change in density and stroke thickness occurs, then the control field appears as a neutral gray surface readily identified by the negative eye.

U.S. Pat. No. 4,527,333 discloses a method and apparatus for indicating a quantitative change in dot area of a image in a printing process. The device has particular application in a halftone printing process to quantitatively determine the changes in halftone dot area as an indicator of an increase or decrease in dot area for graphic arts films, prepress proofs, printing plates, printed press sheets, suitable photomechanical processes and the like. The device includes a square matrix array on a substrate. The array comprises a combination of dots and squares where the dots and squares are each equal in size. A dot is positioned in the center of an array with the squares equally spaced around the center dot and the remaining dots positioned at each corner of the square array. The members of the array are spaced a preselected distance apart forming gaps between the adjacent dots and squares. Upon the occurrence of a dot gain, the adjacent sides of the squares touch the dots. As the dot gain increases, the sides of the squares and circumference of the dots merge and overlap so that the gap disappears. With this arrangement, the size of the gap between dots and squares is selected so that the growth of the dots and squares to close the gap will indicate a given dot area gain or dot area loss.

U.S. Pat. No. 4,566,192 is a further example of a device that includes a pattern for determining the dimensions of projected or printed figures. A geometric pattern is used to maintain accurate dimensions during the manufacture of semiconductor wafers.

While it is has been suggested by the prior art devices to evaluate the resolution quality of an image to be reproduced in a printing process, the known devices rely upon visual evaluation of a control device, pattern, measurement element or the like to identify deformations in the reproduced image. The devices depend upon amplitude modulation for an indication of the print quality. This requires that the printed matter be visually inspected to determine whether the quality is acceptable. In the alternative, the reproduced image can be quantitatively analyzed by use of a microdensitometer. However, the use of a microdensitometer requires substantial technical expertise which is generally beyond the capability of the individual who must evaluate the print quality at the production stage.

Therefore, there is need for a device capable of providing a quantitative measurement of the acutance or sharpness of a reproduced image at various stages in the reproduction process. The device must be capable of being used efficiently by the personnel involved at the various stages in the reproduction process.

SUMMARY OF THE INVENTION

In accordance with the present invention, there is provided a device for quantitatively measuring the sharpness of an image printed on a substrate that includes a control area positioned on the substrate for indicating the sharpness of an image printed thereon. The control area includes a light transmitting image. The image includes a sharp-edged line element of a preselected dimension. The line element is repeated in a preselected pattern to form a plurality of sharp-edged line elements where each element is separated a preselected distance apart by a space. The line element and the space form a cycle pair. The cycle pair is repeated in the control area at a preselected frequency. A range of the frequencies is provided on the control area by varying the number of the cycles from on frequency to the next to quantitatively determine changes in image sharpness on the substrate.

Further, in accordance with the present invention there is provided a method for quantitatively measuring the sharpness of an image printed on a substrate that includes the steps of imaging on the substrate a series of distinct patches containing a plurality of sharp-edged line elements of a preselected width and spaced a preselected distance apart. The line elements are distributed in each patch in a frequency modulated array. The distance between the line elements is varied from patch to patch to obtain a frequency modulated array of line elements varying in optical density from a maximum optical density to a minimum optical density. The optical density of the line elements are measured in a patch selected from a range of patches between the maximum and minimum optical densities. A theoretical optical density of the line elements in the selected patch is calculated. An index of acutance is calculated as the ratio of the theoretical optical density to the measured optical density to determine if the line elements in the selected patch have the desired degree of sharpness.

In addition, the present invention is directed to a method for correcting the sharpness of an image printed on a substrate that includes the steps of imaging on the substrate a series of sharp-edged line elements spaced a preselected distance apart and having a constant width $k_t$. The line elements are distributed in a frequency modulated array where the distance between the line elements varies from a maximum frequency $f_{max}$ where a line and space are first visually discernible to subsequent frequencies where the distance between adjacent line elements increases. The value $\Delta f$ of the difference in frequency between adjacent line segments is determined. The correction k for sharpness of the line segment width is calculated by the formula:

$$k = k_t + \left| \frac{1}{f_{max} + |\Delta f|} - k_t \right|$$

Accordingly, the principal object of the present invention is to provide apparatus for quantitatively measuring the sharpness of an image reproduced by a printing process on a substrate.

A further object of the present invention is to provide an acutance guide for use by personnel at various stages in the print reproduction process to quantitatively measure the image sharpness of the printed image in order to detect a change in image sharpness during the reproduction process so as to make the necessary adjustments in the process to assure that a preselected degree of image sharpness is maintained.

A further object of the present invention is to provide a device used to obtain an index of acutance as a measurement of the sharpness of an image to determine if changes are taking place in the exposure and/or developing procedures for use in graphic arts films, offpress proofs, printing plates or ink on substrate prints as one makes changes in printing materials and press operating conditions.

An additional object on the present invention is to provide a frequency modulated acutance guide for use by craftsmen in the printing industry as a production quality control device while a job is in progress and/or from job to job to evaluate and control product consistency and performance in terms of an index of acutance.

A further object of the present invention is to provide method and apparatus for measuring differences in image sharpness at various stages in a printing process.

These and other objects of the present invention will be more completely disclosed and described in the following specification, the accompanying drawings and the appended claims.

DESCRIPTION OF THE PREFERRED EMBODIMENTS

Figure 1:
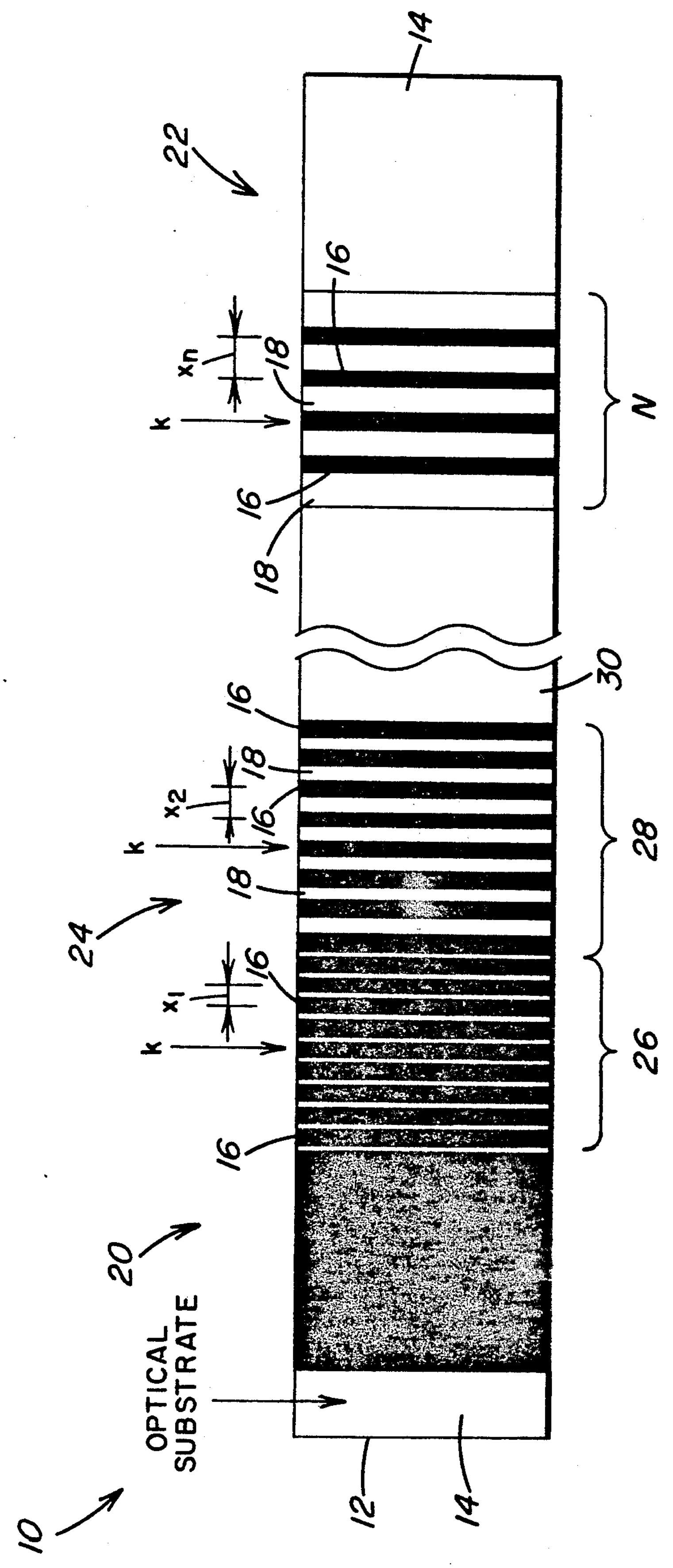
FIG. 1 is an enlarged, fragmentary schematic plan view of a frequency modulated acutance guide in accordance with the present invention, illustrating a control area including printed segments varying in optical density from a maximum optical density to a minimum optical density.
Figure 2:
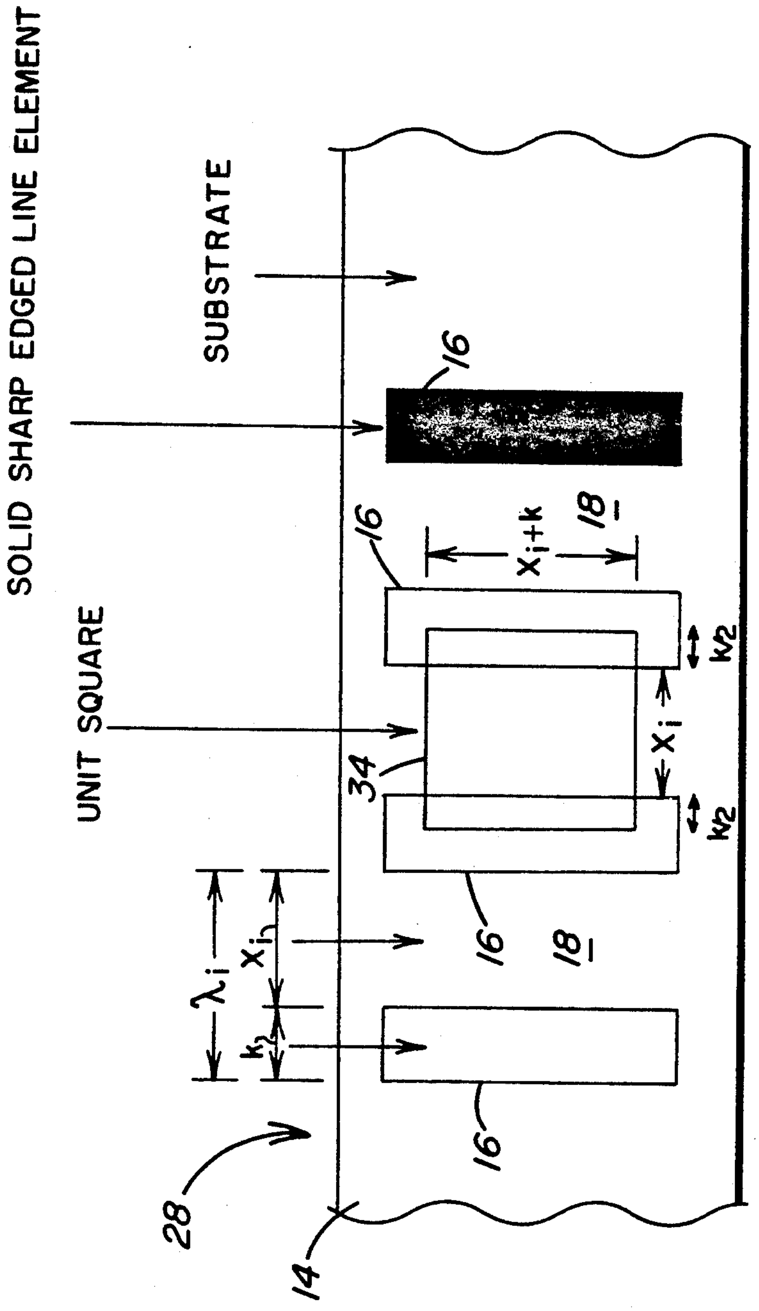
FIG. 2 is a fragmentary schematic plan view of a further enlargement of a segment of the acutance guide shown in FIG. 1, illustrating the images that are formed on photosensitive graphic arts materials or on ink and substrate prints.

Referring to the drawings and particularly to FIGS. 1 and 2, there is illustrated a frequency modulated acutance guide generally designated by the numeral 10 for use in measuring an index of acutance as a quantitative indication of the visual sensation of image sharpness on a substrate used in a printing process. The guide 10 is a quality control device adaptable for use in the printing process to quantitatively determine changes in image sharpness for graphic arts films, offpress proofs, press proofs, printing plates, printed press sheets and the like. The guide is printed by conventional means or in any manner deemed appropriate by one skilled in graphic arts printing on a substrate which is to be evaluated for image sharpness. Preferably, the guide 10 is printed on a marginal area of the substrate, and in one example, includes the dimensions 0.5 in.×2.5 in. FIG. 1 is an enlarged schematic illustration of the acutance guide 10.

As shown in FIG. 1, the acutance guide 10 includes a control area 12 positioned on the substrate 14. The substrate 14 is a selective material used in a lithographic reproduction process from color separations to ink on paper prints. As the substrate 14 proceeds through the reproduction process, the guide 10 is used to quantitatively measure the changes in the sharpness of the image in the control area 12. The control area 12 includes a light transmitting image of a preselected configuration, such as a sharp-edged line element 16 of a preselected dimension. It should be understood that the element 16 may include any other geometric form of a preselected dimension, such as a given width for the line element 16. Each line element 16 within the control area 12 has a given constant width k. FIG. 2 illustrates an enlarged portion of the control area 12 in which the width k of each line element 16 is constant.

Each line element 16 in the control area 12 is repeated in a preselected pattern to form a plurality of sharp-edged line elements 16 where each element 16 is spaced a preselected distance apart by a space 18. The line elements 16 have a constant thickness k. With this arrangement, the control area 12, as shown in FIG. 1, includes a first segment generally designated by the numeral 2 of minimum light transmittance where the distance between the line elements 16 is zero. The line elements are contiguous so that the substrate is fully darkened. Accordingly, the first segment 20 has a solid or maximum uniform optical density. Consequently, a space 18 does not appear between the line elements 16 in segment 20.

The first segment 20 of the guide 10 is positioned at one end of the control area 12 and at the opposite end of the control area 12 is a second segment generally designated by the numeral 22 of maximum light transmittance where the distance between the line elements is infinite so that the substrate is fully clear. The second segment 22 has a substrate or low uniform optical density. No line elements 16 appear in the second segment 22 of the guide control area 12.

A third segment generally designated by the numeral 24 of the control area 12 is positioned intermediate the first segment 20 and the second segment 22. In the third segment 24 the distance between the adjacent line elements 16 is repeated at a preselected frequency. The frequency of line elements 16 in the third segment 24 is determined by the number of cycles of a pair of line element 16 and space 18.

The third segment 24 is divided into a plurality of discrete sections or patches, and any number of sections are provided from a first section 26 to section "n", the last section. Any number of sections, such as sections 28, are positioned between first section 26 and section n before second segment 22. The frequency of line elements 16 in each section 26-*n* varies. Accordingly, a range of frequencies is provided for the respective sections 26, 28, 30, and n in the third or intermediate segment 24 of the guide 10.

The frequency of the line elements 16 in each section 26-*n* is determined by the number of cycles of a pair of line element 16 and space 18 present in the respective section. Thus, the number of cycles in each section forming the third segment 24 of the guide 10 is different. The number of cycles of line element and space pairs progressively decreases from the section 26 adjacent the first segment 20 of solid optical density to the section n adjacent the second segment 22 of substrate optical density. With this arrangement, the section 26 has a maximum frequency of line elements 16 which are first capable of being resolved and therefore contains the greatest number of line elements 16 of constant width.

The first section 26 has the highest spatial frequency of cycles of line element and space pair. In one example, the section 26 includes a fine pattern of 1400 cycles per inch or 1400 pairs of line segment and space. The width of each line element is constant, but the width of the space 18 between line elements 16 in the first section 26 is the smallest of all the respective sections forming the entire segment 24. Further, as an example, section 28 adjacent to the section 26 includes 1300 cycles per inch. Each section thereafter has a lower number of cycles per inch in gradations of 100. In one example of the acutance guide 10 of the present invention, the intermediate segment 24 includes twelve sections in which the first section or section 26 has a frequency of 1400 cycles per inch and the last section or section n has 300 cycles per inch. Each section between the first section at 1400 cycles per inch and the last section at 300 cycles per inch differs in frequency by 100 cycles per inch. It should be understood that this is only one example of the variation in spatial frequency of the respective sections which make up the intermediate segment 24 of the acutance guide 10.

At any point across any of the sharp-edged line elements 16 of width k, the optical density is equivalent or equal to the integrated solid optical density of segment 20. As indicated, all of the line elements 16 have a constant width k. In one embodiment of the acutance guide 10, the width of each line element is 15 microns. Accordingly, for each section 26-*n* of the control area segment 24 line elements 16 of a 15 micron width are repeated at preselected spatial frequencies. The maximum frequency of a repeating pattern is determined where a line element 16 and space 18 are first discernible under appropriate magnification.

Further by way of example, the segment 24 comprising the plurality of sharp-edged line elements 16 in a repeating pattern at preselected spatial frequencies includes the line elements 16 positioned in a vertical array. However, each section of line elements 16 within the segment 24 may also include a first set of vertical parallel lines of a selected frequency perpendicular to a second set of horizontal parallel lines of the same frequency. This arrangement has application where it desired to show any directional effects influencing the guide 10.

Now referring to FIG. 2, there is illustrated an enlarged section, for example the section 28 of the segment 24, of acutance guide 10 containing the line elements 16 as they would appear as images on a selected photo-sensitive graphics arts material or as ink on a paper substrate. As indicated in FIG. 2, the distance between line elements 16 is designated $X_i$ and the width of each line element 16 is designated k. Accordingly, the wave length of the repeating pattern of the line element 16 of width k and space $X_i$ is $\lambda_i$. Further, the spatial frequency of the repeating pattern of line elements and space 18 is designated $f_i$.

Using a commercially available densitometer, the integrated optical density $D_s$ of the segment 20, illustrated in FIG. 1, is measured. Also, the integrated optical density of the segment 22 shown in FIG. 1 is measured with the densitometer where the density of segment 22 is the optical density of the paper substrate and designated $D_p$.

If each of the line element 16 of the various sections of the guide segment 24 were perfectly imaged, the respective section would have a theoretical optical reflectance designated $R_c$. Further, by using a densitometer, the optical reflectance of the paper substrate 14 is measured and designated $R_p$. Similarly, the optical reflectance of the solid area or segment 20 is measured by a densitometer and designated $R_s$. A densitometer is also used to measure the integrated optical density of a selected cycle which is designated $D_{rc}$, and the optical reflectance of the selected cycle is measured and is designated $R_{rc}$. The theoretical integrated optical density of a selected cycle is designated $D_c$.

Once the above measurements are taken by a densitometer, it is possible to calculate the index of acutance for the selected section of repeating line elements based on the theoretical optical density for perfectly imaged line element of the cycle under investigation. The theoretical optical density is calculated in accordance with the following:

$$\lambda_i = k + X_i \tag{1}$$

$$f_i = \frac{1}{\lambda_i} = \frac{1}{k + X_i} \tag{2}$$

or $$X_i = \frac{1}{f_i} - k \tag{3}$$

Referring to FIG. 2, the area of a unit square 34 is designated ASQi.

$$ASQi=(k+x_i)^2=k^2+2Kx_i+s^2_i \tag{4}$$

The area occupied by the space 18 in the unit square 34 is:

$$ASi=X_i(X_i+k)=X^2_i+kX_i \tag{5}$$

The area occupied by line element 16 in the unit square 34 is:

$$ALi=2(k/2)\,(k+X_i)=k^2+kX_i \tag{6}$$

For any given frequency, the percentage of area of guide 10 occupied by the line elements 16 is:

$$ALfi = \frac{k^2 + kx_i}{k^2 + 2kx_i + x_i^2} \tag{7}$$

Similarly, the percentage of the area of the guide 10 occupied by the substrate 14 is:

$$APfi = \frac{1 - k^2 + kx_i}{k^2 + 2kx_i + x_i^2} \quad (8)$$

By combining the above equations 7 and 8, the theoretical optical reflectance of any selected section of the segment 24 of the acutance guide 10 is calculated as follows:

$$R_c = R_p\left(1 - \frac{k^2 + kx_i}{k^2 + 2kx_i + x_i}\right) + R_s\left(1 - \frac{k^2 + kx_i}{k^2 + 2kx_i + x_i}\right) \quad (9)$$

Using the above equations 9 and 3, the theoretical optical density for any selected section of the guide segment 24 is calculated as follows:

$$D_c = \log\left(\frac{1}{R_c}\right) = \log\left[\frac{1}{10^{-D_p}\left(1 - \frac{k^2 + k\left(\frac{1}{f_i} - k\right)}{k^2 + 2k\left(\frac{1}{f_i} - k\right) + \left(\frac{1}{f_i} - k\right)^2}\right) + 10^{-D_s}\left(\frac{k^2 + k\left(\frac{1}{f_i} - k\right)}{k^2 + 2k\left(\frac{1}{f_i} - k\right) + \left(\frac{1}{f_i} - k\right)^2}\right)}\right] \quad (10)$$

The index of acutance for any selected section is then calculated as the ratio of the theoretical optical density divided by the measured optical density:

$$\text{index of acutance} = \frac{D_c}{D_{rc}} \quad (11)$$

If the acutance guide is perfectly imaged where the line elements 16 are printed or imaged with perfectly sharp edges, then the ratio of the theoretical optical density $D_c$ to the measured integrated optical density $D_{rc}$ is equal to 1.0. However, if the acutance guide 10 is not perfectly imaged where the line elements 16 are printed or imaged with soft or vignetted edges 36 as illustrated by the line elements 16 of a guide segment shown in FIG. 3, then the index of acutance is less than 1.0.

The acutance guide 10 of the present invention is operable for use at any stage in the reproduction process by operating personnel. Thus, at any stage in the reproduction process, the index of acutance of any selected section of the guide 10 for the particular substrate can be measured by operating personnel without having to use complex scientific equipment. The index of acutance is determined by use of the acutance guide 10 of the present invention and a commercially available integrating densitometer. The densitometer is used to obtain a measurement of the integrated optical density of the desired guide segment. Then the above equation 10 is used to compute the theoretical integrated optical density Once the values of the measured integrated optical density and theoretical integrated optical density are determined, the index of acutance is derived in accordance with the above equation 11. In this manner, the index of acutance provides a quantitative measurement of the sharpness of the image on the desired substrate which includes graphic arts films, offpress proofs, printing plates, ink and substrate prints and the like.

In comparison with the prior art devices where the quality of the printed images is based on an evaluation of modulated resolution, the acutance guide 10 of the present invention enables one quickly to quantitatively obtain a value of the sharpness of an image on a substrate. The image sharpness can be monitored through the various stages of reproduction and accordingly allows for the production personnel to monitor any changes that may occur in the degree of sharpness as indicated by the index of acutance of the image. This can be accomplished while a job is in progress. If an unacceptable index of acutance is measured, then the production cycle may be interrupted and the necessary changes made to correct the image sharpness to obtain the desired index of acutance.

The ability to monitor changes in the index of acutance applies to the exposure and/or developing procedures used in all types of reproduction in the graphic arts, such as films, offpress proofs, printing plates, ink on substrate prints and the like. Therefore, different graphic arts materials can be tested based on the index of acutance, and the appropriate material for the substrate printing condition and/or equipment can be selected to obtain the optimum results based on a measurement of the index of acutance.

At the various stages in the reproduction process, the image sharpness may increase or decrease and the magnitude of change is readily identified by measuring the index of acutance This is particularly helpful in establishing acceptable differences in image sharpness between offpress proof and ink on paper prints. The acutance guide 10 is a versatile tool usable by personnel in the printing industry who are accustomed to using a commercially available integrating densitometer. The guide 10 is useful at all stages of the production job and easily transferred from job to job to evaluate and control product consistency and performance in terms of image sharpness as indicated by the index of acutance measured as above described.

The acutance guide 10 is frequency modulated; therefore, once the maximum frequency where the line elements are first capable of being resolved has been visually determined, under appropriate magnification, then the index of acutance is the same at any other lower frequency in the guide 10. Thus, once the user of the guide identifies the maximum frequency of the guide, the index of acutance of any segment having a frequency less than the maximum frequency can be measured.

The acutance guide 10 of the present invention is a versatile tool in monitoring and controlling image sharpness in many areas of the reproduction process. For example, it is applicable to measure an index of acutance in the offpress color proofing area, film contacting area, platemaking area and on the lithographic sheet-fed and heatset web offset presses from color separations to ink on paper prints. For these reasons, the acutance guide of the present invention is a useful quality control device for quantitatively measuring and monitoring changes in image sharpness in a wide variety of applications in the printing and photographic reproduction processes.

Figure 4:
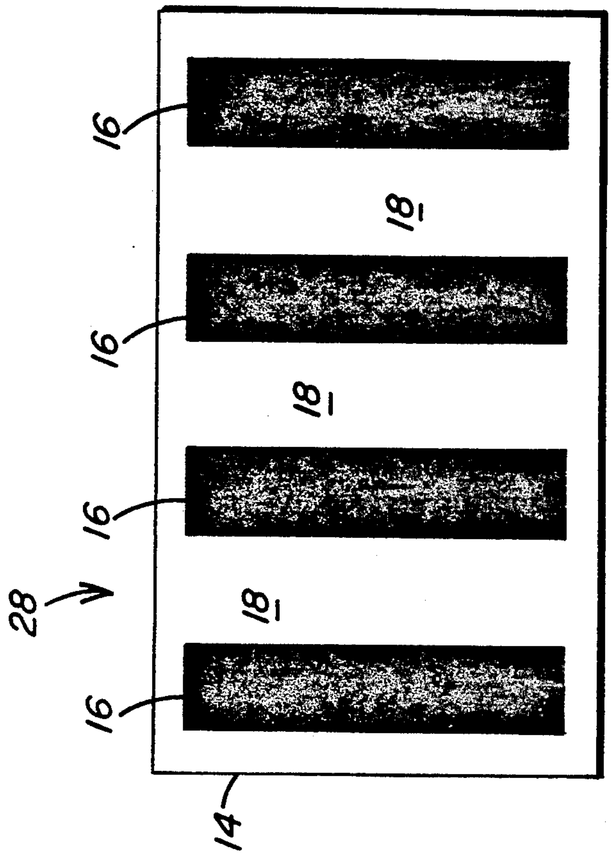
FIG. 4 is a further enlarged schematic illustration of a simulated segment of the acutance imaged on an offpress color proofing system for a 900 cycle segment.
Figure 3:
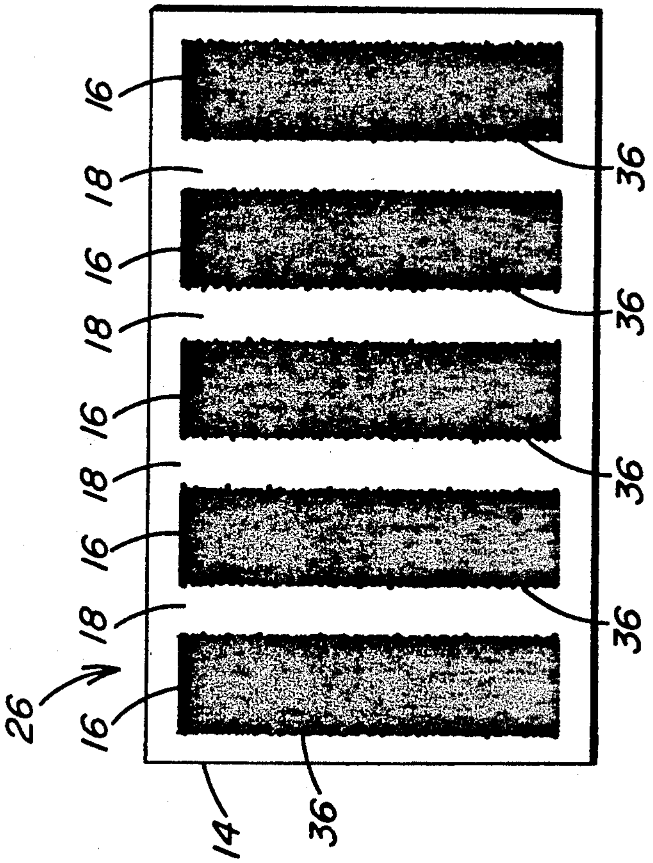
FIG. 3 is a enlarged schematic illustration of a simulated segment of the acutance guide imaged on an offpress color proofing system for a 1200 cycle segment.

Now referring to FIGS. 3 and 4, there is illustrated a comparison of the degree of image sharpness based on the substrate used. FIG. 3 illustrates an enlarged section of the segment 24 of the guide 10 shown in FIG. 1. For example, section 26 is illustrated having line elements 16 of a constant width k imaged on an offpress color proofing substrate 14. The spatial frequency of the line elements 16 based on a cycle of a line-space pair is 1200 cycles per inch where one cycle is a line and space pair. At this spatial frequency, the edge 36 of each line is soft or vignetted as seen in FIG. 3. The index of acutance is calculated to be 0.80.

FIG. 4 is an enlarged simulation of another section of the guide segment 24, such as the section 28 illustrated in FIG. 1 on a offpress color proofing substrate 14. For the section 28, the spatial resolution is 900 cycles. A visual comparison of the respective sections in FIGS. 3 and 4 indicates that the sensation of sharpness of the edge of the lines 16 for section 26 in FIG. 3 is less than the sharpness of the edge of the lines 16 for the section 28 shown in FIG. 4. By using a commercially available integrating densitometer, the index of acutance for the section 28 is measured to be 0.95 for the offpress color proofing substrate 14.

While the line elements 16 for both sections 26 and 28 have the same width, it appears as if the line elements 16 for the section 28 have a width less than the width of the line elements 16 in section 26 because of the vignetted nature of the edges 36 of the line elements 16 in section 26. The calculated index of acutance accordingly provides a quantitative indication of the degree of sharpness of the images between the sections 26 and 28. This information is therefore very useful in evaluating the degree of sharpness that can be obtained for a preselected spatial frequency for the given substrate in the reproduction process.

From a comparison of the degree sharpness of the line elements 16 for sections 26 and 28 of the guide 10 shown in FIGS. 3 and 4, it is apparent that the guide 10 is sensitive to unsharp line edges. The guide 10 is a light transmitting device which is imaged by light exposure to photo-sensitive materials. Accordingly, it is desirable to introduce a correction factor to account for the portion of the density gain that is due to image spread (dot gain). The line width of the line element 16 can be altered during exposure. Therefore, a correction is made to the imaged line width in order to obtain the desired degree of sharpness that approaches an index of acutance of 1.0.

In order to identify the correction factor, the maximum frequency of the acutance guide 10 where the line elements 16 are first resolved is designated $f_{max}$. The width of the line element in the original acutance guide 10 is $k_t$. The width of the absolute value of the difference in frequency between adjacent sections for the guide segment 24 of the guide 10 shown in FIG. 1 is $\Delta f$. The correction for exposure of the imaged line width k of the line element 16 is then calculated as follows:

$$k = k_t + \left| \frac{1}{f_{max} + |\Delta f|} - k_t \right|$$

By calculating the correction factor, the acutance guide can be imaged on photo-sensitive graphic arts materials to account for variations in exposure or reproduce the guide 10 with ink on paper prints or other substrates. Then, by using a commercially available integrating densitometer, the index of acutance is computed.

It should also be understood in accordance with the present invention that the repeating pattern of line elements 16 can have a preselected geometric configuration, such as a plurality of concentric annulars of a given width at desired spatial frequencies. Also, the line elements can be oriented in any desired angular direction to show directional changes in image sharpness or directional changes in the index of acutance. For example, the line elements can be oriented perpendicular to one another to show directional changes in image sharpness which may occur on a printing press in the direction of printing as compared to the image sharpness perpendicular to the printing direction. Also, while the above described acutance guide 10 is a physical light transmitting device, the guide 10 can be digitized and incorporated as a quality control digital image for applications in direct digital graphic arts imaging systems or equipment for verifying the input or output of these systems and/or equipment.

For example, a digital version of the guide 10 can be used to verify direct digital color proofs, printing plates or direct digital reproductions of black and white and/or color line art, text or pictorial images. Furthermore, while the acutance guide has been described above for use in graphic arts applications, it should also be understood that the guide 10 is applicable in other industries where photographic or photomechanical processes are used or where it is desirable to quantitatively measure image sharpness in terms of an index of acutance.

According to the provisions of the patent statutes, we have explained the principle, preferred construction, and mode of operation of our invention and have illustrated and described what we now consider to represent its best embodiments. However, it should be understood, that within the scope of the appended claims, the invention may be practiced otherwise than as specifically illustrated and described.

We claim:

1. A device for quantitatively measuring the sharpness of an image printed on a substrate comprising,
   - a control area positioned on the substrate for indicating the sharpness of an image printed thereon,
   - said control area including a light transmitting image,
   - said image including a sharp-edged line element of a preselected dimension,
   - said line element repeated in a preselected pattern to form a plurality of sharp-edged line elements where each element is separated a preselected distance apart by a space,
   - said line element and said space forming a cycle pair,
   - said cycle pair repeated in said control area at a preselected frequency, and
   - a range of said frequencies provided on said control area by varying the number of said cycles from one frequency to the next to quantitatively determine changes in image sharpness on the substrate.

2. A device as set forth in claim 1 in which,
   - said control area is divided in segments,
   - a first segment of said control area having minimum light transmittance where the distance between said elements is zero, a second segment having maximum light transmittance where the distance between said elements is infinite, and a third segment intermediate said first and second segments where the distance between adjacent elements falls within said range of frequencies to provide an optical density ranging from said minimum light transmittance to said maximum light transmittance.

3. A device as set forth in claim 1 in which, said line element has a constant fixed width throughout said range of frequencies.

4. A device as set forth in claim 1 in which, said cycle pair of line element and space vary in width throughout said range of said frequencies by a change in the width of said space between adjacent line elements.

5. A device as set forth in claim 1 which includes, a plurality of patches of line elements arranged in an array of cycle pairs of line element and space, and said line element in each patch having a fixed constant width and said space of a preselected width with the width of said space varying from patch to patch to provide said range of frequencies from a fine pattern having a minimum space width to a coarse pattern having a maximum space width.

6. A device as set forth in claim 1 in which, said frequency of said cycle pair of line element and space is varied by changing the width of said space between adjacent line elements.

7. A device as set forth in claim 1 in which, said control area varies in optical density from a solid optical density to a substrate optical density, said solid optical density being represented by said control area where said line elements of a fixed width are contiguous, and said substrate optical density being represented by said control area where said line elements of a fixed width no longer appear.

8. A device as set forth in claim 7 in which, said control area optical density between said solid optical density and said substrate optical density is determined by the number of cycle pairs of line element and space in a preselected length of said control area.

9. A device as set forth in claim 1 in which, said line element has a fixed width constant throughout said range of frequencies of 15 microns.

10. A device as set forth in claim 1 in which, said control area includes a plurality of patches of line elements distributed in a frequency modulated array.

11. A device as set forth in claim 10 in which, said range of said frequencies varying from one patch to the next by increasing the number of said cycle pairs located in said patch.

12. A device as set forth in claim 11 in which, said range of said frequencies varies from 300 cycles per inch in a first patch in increments of 100 cycles per inch for each patch up to 1,400 cycles per inch in one of said patches.

13. A device as set forth in claim 1 which includes, means for measuring the optical density of said cycle pair of line element and space and comparing said measured optical density to a theoretical optical density to obtain an index of acutance of said cycle.

14. A method for quantitatively measuring the sharpness of an image printed on a substrate comprising the steps of, imaging on the substrate a series of distinct patches containing a plurality of sharp-edged line elements of a preselected width and spaced a preselected distance apart, distributing the line elements in each patch in a frequency modulated array, varying the distance between line elements from patch to patch to obtain a frequency modulated array of line elements varying in optical density from a maximum optical density to a minimum optical density, measuring the optical density of the line elements in a patch selected from a range of the patches between the maximum and minimum optical densities, calculating a theoretical optical density of the line elements in the selected patch, and calculating an index of acutance as the ratio of the theoretical optical density to the measured optical density to determine if the line elements in the selected patch have the desired degree of sharpness.

15. A method as set forth in claim 14 which includes, imaging the patches on a photo sensitive substrate.

16. A method as set forth in claim 14 which includes, comparing the calculated index of acutance to an optimum index of acutance of 1.0.

17. A method as set forth in claim 16 which include, altering the width of the line elements to correct the calculated index of acutance to obtain a desired index of acutance.

18. A method as set forth in claim 14 which includes, measuring the optical density of the line elements by a densitometer to obtain a quantitative measurement $D_{rc}$, calculating the theoretical optical density of the line elements to obtain a quantitative measurement $D_c$, and calculating the ratio $D_c/D_{rc}$ to obtain the index of acutance representing a quantitative measurement of the sharpness of the image on the substrate.

19. A method for correcting the sharpness of an image printed on a substrate comprising the steps of, imaging on the substrate a series of sharp-edged line elements spaced a preselected distance apart and having a constant width $k_t$, distributing the line elements in a frequency modulated array where the distance between the line elements varies from a maximum frequency $f_{max}$ where a line and space are first visually discernible to subsequent frequencies where the distance between adjacent line elements increases, determining the value $\Delta f$ of the difference in frequency between adjacent line segments, and calculating the correction for the sharpness of the line segment width by the formula:

$$k = k_t + \left| \frac{1}{f_{max} + |\Delta f|} - k_t \right|$$

20. A method as set forth in claim 19 which includes, correcting the width of the line element to correspond to the calculated value k to obtain the desired degree of sharpness of the image on the substrate.

* * * * *